United States Patent [19]
Singh et al.

[11] Patent Number: 5,728,315
[45] Date of Patent: Mar. 17, 1998

[54] AZEOTROPE-LIKE COMPOSITIONS OF TRIFLUOROMETHANE, CARBON DIOXIDE, ETHANE AND HEXAFLUOROETHANE

[75] Inventors: Rajiv Ratna Singh, Getzville; Ian Robert Shankland, Williamsville; Roy Phillip Robinson, Cheektowaga; Hang Thanh Pham, Amherst; Raymond Hilton Percival Thomas, Pendleton; Peter Brian Logsdon, N. Tonawanda, all of N.Y.

[73] Assignee: AlliedSignal Inc., Morristown, N.J.

[21] Appl. No.: 641,584

[22] Filed: May 1, 1996

[51] Int. Cl.$^6$ .............................. C09K 5/04; C11D 7/30; C08J 9/14

[52] U.S. Cl. .................. 252/67; 252/69; 510/177; 510/410; 510/411; 62/114; 62/324.1; 521/910; 521/131; 521/98; 264/53; 264/DIG. 5

[58] Field of Search ............... 252/67, 69; 510/177, 510/410, 411, 412, 415; 62/114, 324.1; 521/910, 131, 98; 264/53, DIG. 5

[56] References Cited

U.S. PATENT DOCUMENTS

| | | | |
|---|---|---|---|
| 3,962,155 | 6/1976 | Usamoto et al. | 260/2.5 R |
| 4,248,811 | 2/1981 | Doyle et al. | 264/46.6 |
| 4,367,178 | 1/1983 | Heigel et al. | 260/403 |
| 5,162,381 | 11/1992 | Richard et al. | 521/89 |
| 5,210,240 | 5/1993 | Peter et al. | 554/11 |
| 5,340,490 | 8/1994 | Decaire et al. | 252/67 |
| 5,393,521 | 2/1995 | Lance-Gomez et al. | 424/70.12 |
| 5,558,094 | 9/1996 | Quay | 128/662.02 |
| 5,558,854 | 9/1996 | Quay | 424/9.52 |
| 5,670,102 | 9/1997 | Perman et al. | 264/50 |

FOREIGN PATENT DOCUMENTS

| | | | |
|---|---|---|---|
| 156374 | 10/1985 | European Pat. Off. | C07F 9/10 |
| 437451 | 7/1991 | European Pat. Off. | A61K 9/14 |
| 610953 | 8/1994 | European Pat. Off. | C08J 9/18 |
| 05186765 | 7/1993 | Japan | C09K 5/00 |
| 07048563 | 2/1995 | Japan | C09K 5/04 |
| WO 94/01512 | 1/1994 | WIPO | C09K 5/04 |

OTHER PUBLICATIONS

Moss, J.H., et al., "Fluorination of methane and related compounds by copper(II) fluoride", J. Fluorine Chem., 6(5)(1975), 393–416, Month not known –75.

*Primary Examiner*—Douglas J. McGinty
*Attorney, Agent, or Firm*—Lois A. Giannesch

[57] ABSTRACT

Azeotrope-like compositions of trifluoromethane, carbon dioxide, ethane, and hexafluoroethane are provided. The compositions of the invention are environmentally desirable for use as refrigerants, aerosol propellants, blowing agents for polymer foam, heat transfer media, and gaseous dielectrics.

17 Claims, No Drawings

AZEOTROPE-LIKE COMPOSITIONS OF TRIFLUOROMETHANE, CARBON DIOXIDE, ETHANE AND HEXAFLUOROETHANE

FIELD OF THE INVENTION

The present invention relates to mixtures of trifluoromethane, carbon dioxide, ethane, and hexafluoroethane. More particularly, the invention provides azeotrope-like compositions of trifluoromethane, carbon dioxide, ethane, and hexafluoroethane that are environmentally desirable for use as refrigerants, aerosol propellants, blowing agents for polymer foam, heat transfer media, and gaseous dielectrics.

BACKGROUND OF THE INVENTION

Fluorocarbon based fluids have found widespread use in industry in a number of applications, including as refrigerants, aerosol propellants, blowing agents, heat transfer media, and gaseous dielectrics. Certain of these fluids, such as the chlorofluorocarbons ("CFC's") and the hydrochlorofluorocarbons ("HCFC's") are suspected of causing environmental problems in connection with the earth's protective ozone layer. For example, R-503, a mixture of chlorotrifluoromethane and trifluoromethane, is an ozone depleting mixture due to the presence of the chlorotrifluoromethane.

Additionally, it is known that the use of single component fluids or azeotropic mixtures, which mixtures do not fractionate on boiling and evaporation, is desirable. However, the identification of new, environmentally safe, azeotropic mixtures is complicated due to the fact that it is impossible to predict azeotrope formation.

The discovery of suitable substitutes for CFC's and HCFC's is complicated further because any substitute must possess those properties, such as chemical stability, low toxicity, inflammability, and efficiency in use unique to the CFC or HCFC it replaces. Finally, an ideal substitute would not require major engineering changes in current technology, such as the conventional vapor compression technology currently used with CFC and HCFC refrigerants.

Thus, the art continually is seeking new fluorocarbon based mixtures that offer alternatives, and are considered environmentally safe substitutes, for CFC's and HCFC's.

DESCRIPTION OF THE INVENTION AND PREFERRED EMBODIMENTS

This invention provides azeotrope-like compositions comprising effective amounts of trifluoromethane ("R-23"), carbon dioxide, ethane, and hexafluoroethane ("R-116"). More specifically, the invention provides azeotrope-like compositions preferably of from about 15 to about 60 weight percent R-23, from about 5 to about 40 weight percent carbon dioxide, from about 15 to about 60 weight percent ethane and from about 15 to about 60 weight percent R-116, the compositions having a boiling point of −99° C.±2°, preferably ±1° C., at 760 mm Hg. The preferred, more preferred, and most preferred compositions of the invention are set forth in Table 1. The numerical ranges in Table 1 are to be understood to be prefaced by the term "about".

TABLE 1

| Components | Preferred (wt %) | More Preferred (wt %) | Most Preferred (wt %) |
|---|---|---|---|
| R-23 | 15–60 | 15–50 | 18–40 |
| $CO_2$ | 5–40 | 5–30 | 5–20 |
| Ethane | 15–60 | 15–50 | 20–40 |
| R-116 | 15–60 | 15–50 | 20–40 |

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., or are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a nonazeotropic mixture into its separate components. If the mixture containing the additional component is nonazeotropic or nonazeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like, or constant boiling. All such compositions are intended to be covered by the terms "azeotrope-like" and "constant boiling". As an example, it is well known that at differing pressures, the composition of a given azeotrope will vary at least slightly as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

The compositions of the invention meet the need in the art for a refrigerant that has a low ozone depletion potential and is a negligible contributor to greenhouse global warming, is nonflammable, and has a low compressor discharge temperature. Additionally, the compositions of the invention offer superior efficiency and capacity when compared to such fluids as R-23 alone, which R-23 has been proposed as a potential replacement for ozone depleting mixtures such as R-503. Further, because the compositions of the invention exhibit constant vapor pressure characteristics and relatively minor composition shifts as the liquid mixture is evaporated, the composition is comparable to a constant boiling single component refrigerant or an azeotropic mixture refrigerant.

In a process embodiment, the azeotrope-like compositions of the invention may be used in a method for producing refrigeration that comprises condensing a refrigerant comprising the azeotrope-like compositions of this invention and thereafter evaporating the refrigerant in the vicinity of a body to be cooled. In yet another process embodiment, the compositions of the invention may be used in a method for heating that comprises condensing a refrigerant comprising the azeotrope-like compositions of the invention in the vicinity of a body to be heated and thereafter evaporating the refrigerant.

In still another embodiment, the compositions of the invention may be used in a method for producing foam comprising blending a heat plasticized resin with a volatile bowing agent comprising the azeotrope-like compositions of the invention and introducing the resin/volatile blowing agent blend into a zone of lower pressure to cause foaming.

In another process embodiment, the azeotrope-like compositions of the invention are used in a method for producing polyurethane and polyisocyanurate foams. The method comprises reacting and foaming a mixture of ingredients that forms the polyurethane and polyisocyanurate foams in the presence of a volatile blowing agent comprising the azeotrope-like compositions of the present invention. Alternatively, the azeotrope-like compositions of the invention may be used in a premix of polyol and blowing agent, which premix comprises the azeotrope-like compositions of the invention prior to reaction and foaming of the ingredients forming polyurethane and polyisocyanurate foams. The blowing agents of the invention may be used alone or in premix with a polyol.

It is also possible to produce thermoplastic foams using the compositions of the invention. For example, conventional foam polyurethanes and isocyanurate formulations may be combined with the azeotrope-like composition in a conventional manner to produce rigid foams.

The compositions of the invention may also be used as heat transfer fluids. For example, in certain refrigeration systems, it is desirable to operate the system at a specific temperature. However, maintaining the desired temperature may require either the addition or removal of heat. Thus, a secondary heating loop containing an appropriate heat transfer fluid may be added. The heat transfer fluid absorbs heat in one part of the cycle and transfers the heat to another part of the cycle without changing state, when the heat transferred is sensible, or by changing state, when the heat transferred is latent.

The compositions of the invention may also be used as propellants for aerosol sprays.

The components of the composition of the invention are commercially available. Preferably, the components are of sufficiently high purity so as to avoid the introduction of adverse influences on the properties, such as constant boiling, of the system.

Additional components may be added to tailor the properties of the azeotrope-like compositions of the invention as needed. By way of example, oil solubility aids may be added in the case in which the compositions of the invention are used as refrigerants.

The invention will be clarified further by a consideration of the following examples that are intended to be purely exemplary.

EXAMPLES

Example 1

A 150 g mixture of 25 weight percent of R-23, $CO_2$, ethane, and R-116 was charged into a low temperature distillation column with approximately 150 theoretical separation stages. The mixture was allowed to equilibrate for at least 1 hour. The overhead composition of the distillate remained at about 13 weight percent $CO_2$, 26 weight percent R-23, 31 weight percent R-116, and 29 weight percent ethane. The composition was determined by gas chromatography. These components could not be separated. The boiling point of the mixture was noted to be about −99° C., lower than the boiling points of each individual component.

Example 1 demonstrates, by virtue of the fact the quaternary mixture cannot be separated into its components even by a very efficient distillation column, that the composition is azeotrope-like.

Example 2

The theoretical performance of a refrigerant at specific operating conditions can be estimated from the thermodynamic properties of the refrigerant using standard refrigeration cycle analysis techniques. See, e.g., R. C. Downing *Fluorocarbon Refrigerants Handbook*, Prentice Hall (1988). The coefficient of performance, COP, is a universally accepted measure especially useful in representing the relative thermodynamic efficiency of a refrigerant in a specific heating or cooling cycle involving evaporation or condensation of a refrigerant. This term expresses the ratio of useful refrigeration to the energy applied by the compressor in compressing the vapor. The capacity of a refrigerant represents the volumetric efficiency of the refrigerant. This value expresses the capability of a compressor to pump quantities of heat for a given volumetric flow rate of refrigerant. In other words, given a specific compressor, a refrigerant with a higher capacity will deliver more cooling or heating power.

This type of calculation is performed for a low temperature cycle in which the condenser temperature was −30° F. and the evaporator temperature was −120° F. Isentropic compression was assumed and the suction temperature was 20° F. Table II lists the COP and capacity of the four component composition of the invention relative to R-23.

TABLE II

| Refrigerant | COP | Capacity |
|---|---|---|
| Four Component Mixture | 1.03 | 2.1 |
| R-23 | 1.00 | 1.0 |

As Table II illustrates, the four component composition of the invention is advantageous compared to R-23 in that the composition has a higher COP and capacity.

Example 3

40 g of the azeotrope-like composition of Example 1 are charged into a 200 cc sealed vessel containing 3 g on Dow styrene 685D. The vessel is placed in a 250° F. oven overnight. Twenty-four hours later, the vessel is removed from the oven and rapidly depressurized. The resulting foam is inspected and found to be of good quality.

What is claimed is:

1. An azeotrope-like composition consisting essentially of from about 15 to about 60 weight percent trifluoromethane, from about 5 to about 40 weight percent carbon dioxide, from about 15 to about 60 weight percent ethane, and from about 15 to about 60 weight percent hexafluoroethane which composition boils at about −99° C.±2° C. at 760 mm Hg.

2. A method for producing foam comprising blending a heat plasticized resin with a volatile blowing agent comprising the composition of claim 1 in a zone of higher pressure and introducing the resin/volatile blowing agent blend into a zone of lower pressure to cause foaming.

3. The composition of claim 1 consisting essentially of from about 15 to about 50 weight percent trifluoromethane, from about 5 to about 30 weight percent carbon dioxide, from about 15 to about 50 weight percent ethane, and from about 15 to about 50 weight percent hexafluoroethane.

4. The composition of claim 1 consisting essentially of from about 18 to about 40 weight percent trifluoromethane, from about 5 to about 20 weight percent carbon dioxide, from about 20 to about 40 weight percent ethane, and from about 20 to about 40 weight percent hexafluoroethane.

5. The composition of claim 1 consisting essentially of about 26 weight percent trifluoromethane, about 13 weight percent carbon dioxide, about 29 weight percent ethane, and about 31 weight percent hexafluoroethane.

6. A method for producing refrigeration comprising condensing a refrigerant comprising the azeotrope-like composition of claim 1 away from a body to be cooled and thereafter evaporating the refrigerant in the vicinity of the body to be cooled.

7. A premix comprising a polyol and a blowing agent, the blowing agent comprising the composition of claim 1.

8. A method for producing refrigeration comprising condensing a refrigerant comprising the azeotrope-like composition of claim 3 away from a body to be cooled and thereafter evaporating the refrigerant in the vicinity of the body to be cooled.

9. A method for producing refrigeration comprising condensing a refrigerant comprising the azeotrope-like composition of claim 4 away from a body to be cooled and thereafter evaporating the refrigerant in the vicinity of the body to be cooled.

10. A method for producing heating comprising condensing a refrigerant comprising the azeotrope-like composition of claim 1 in the vicinity of a body to be heated and thereafter evaporating the refrigerant away from the body.

11. A premix comprising a polyol and a blowing agent, the blowing agent comprising the composition of claim 3.

12. A method for producing heating comprising condensing a refrigerant comprising the azeotrope-like composition of claim 3 in the vicinity of a body to be heated and thereafter evaporating the refrigerant away from the body.

13. A method for producing heating comprising condensing a refrigerant comprising the azeotrope-like composition of claim 4 in the vicinity of a body to be heated and thereafter evaporating the refrigerant away from the body.

14. A method for producing polyurethane and/or polyisocyanurate foams comprising reacting and foaming a mixture of ingredients that will react to form the polyurethane and/or polyisocyanurate foams with a volatile blowing agent comprising the composition of claim 1.

15. A premix comprising a polyol and a blowing agent, the blowing agent comprising the composition of claim 4.

16. A method for producing polyurethane and/or polyisocyanurate foams comprising reacting and foaming a mixture of ingredients that will react to form the polyurethane and/or polyisocyanurate foams with a volatile blowing agent comprising the composition of claim 3.

17. A method for producing polyurethane and/or polyisocyanurate foams comprising reacting and foaming a mixture of ingredients that will react to form the polyurethane and/or polyisocyanurate foams with a volatile blowing agent comprising the composition of claim 4.

* * * * *